May 19, 1964 A. LUSCOMBE 3,133,727
FEED MIXER APPARATUS
Filed Jan. 30, 1963 2 Sheets-Sheet 1

INVENTOR
ARTHUR LUSCOMBE
BY Williamson & Palmatier
ATTORNEYS

May 19, 1964   A. LUSCOMBE   3,133,727
FEED MIXER APPARATUS
Filed Jan. 30, 1963   2 Sheets-Sheet 2
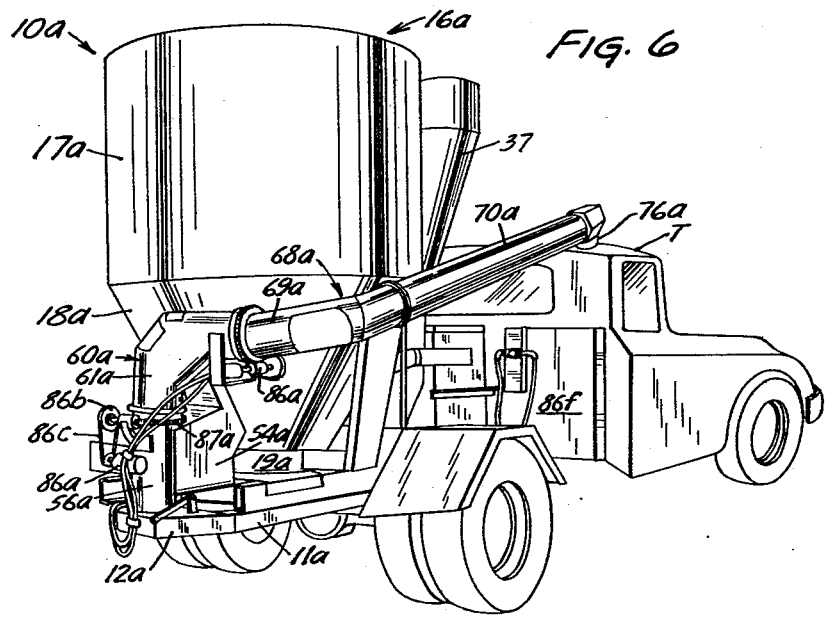
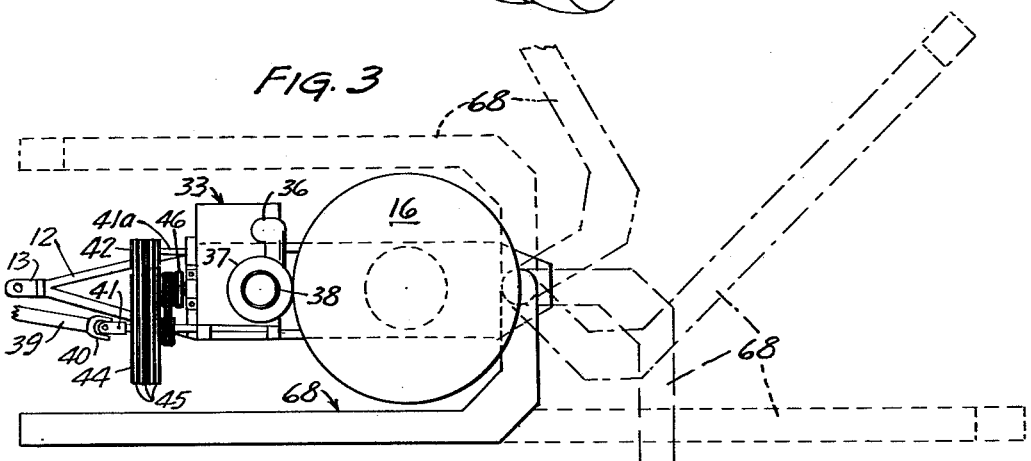
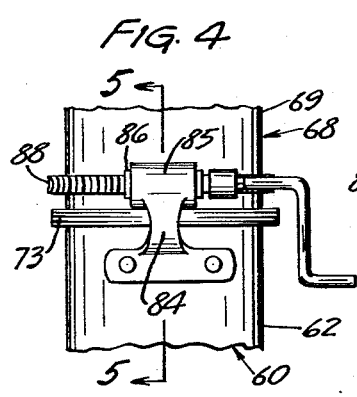
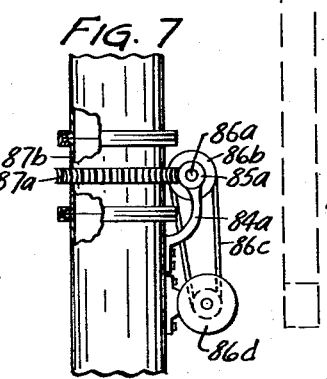
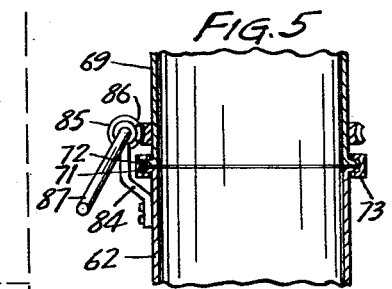
INVENTOR
ARTHUR LUSCOMBE
BY Williamson + Palmatier
ATTORNEYS

United States Patent Office 3,133,727
Patented May 19, 1964

3,133,727
FEED MIXER APPARATUS
Arthur Luscombe, Armstrong, Iowa
Filed Jan. 30, 1963, Ser. No. 255,061
7 Claims. (Cl. 259—8)

This invention relates to mobile apparatus for use in mixing particulate material such as grain and the like, and more specifically with mobile feed mixing apparatus having provision for unloading the particulate material to any desirable point.

An object of this invention is to provide a novel mobile feed mixing apparatus, of simple and inexpensive construction, including a hopper having means for effectively mixing the particulate material therewithin, and having uniquely constructed discharge conveyor means including a plurality of conveyor sections arranged and constructed to permit direct unloading of the material at any desirable location.

Another object of this invention is to provide a novel and improved feed mixing apparatus including a mixing hopper mounted on a mobile frame and having a rearwardly facing feed outlet therein, and discharge conveyor means including a plurality of right angular conveying sections adjustably connected to permit substantial universal action thereof whereby unloading points, both above and below the ground surface, may be readily reached by the conveyor means.

A more specific object of this invention is to provide a novel mobile feed mixer apparatus of the class described including an auger mixing assembly disposed within the hopper wherein the lower end portion of the auger mixing assembly is of enlarged cross-sectional configuration, conforming generally to the cylindrical lower end portion of the hopper to thereby permit highly effective mixing of the material within the hopper.

These and other objects and advantages of my invention will more fully appear from the following description made in connection with the accompanying drawings wherein like character references refer to the same or similar parts throughout the several views, and in which:

FIG. 3 is a diagrammatic top plan view of the invention with certain parts thereof illustrated in adjusted position by dotted line configuration;

FIG. 4 is a fragmentary detailed side elevational view on an enlarged scale of the means for adjusting the conveyor section;

FIG. 5 is a cross-sectional view taken approximately along line 5—5 of FIG. 4 and looking in the direction of the arrows;

FIG. 6 is a rear perspective view of a modified form of my invention; and

FIG. 7 is a fragmentary detailed side elevational view illustrating the means for adjusting a pair of conveyor sections of the discharge conveyor means illustrated in the embodiment of FIG. 6.

Figure 1:
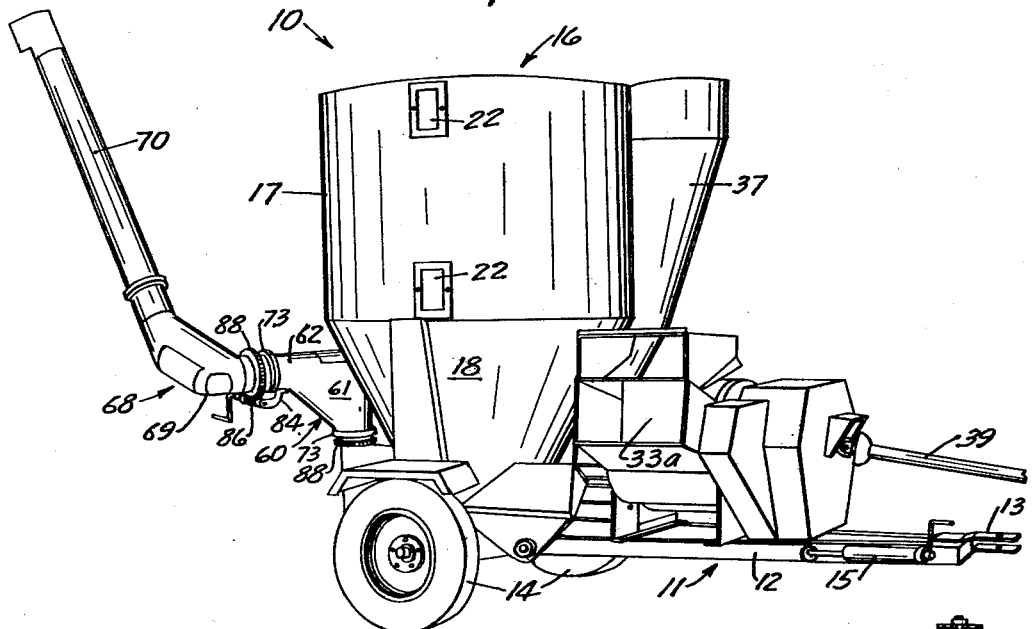
FIG. 1 is a perspective view of one embodiment of my invention.
Figure 2:
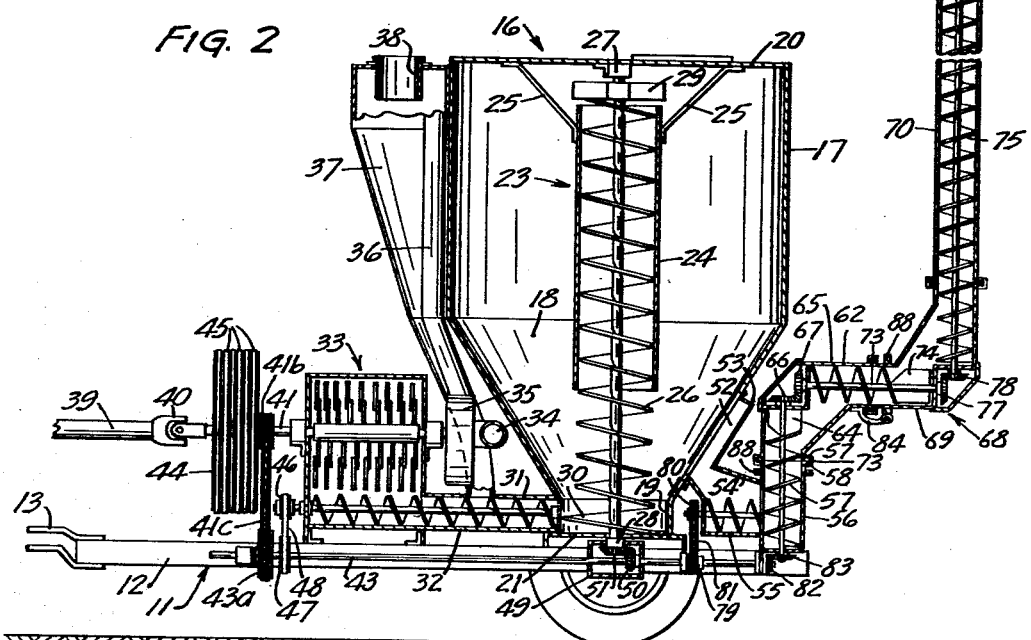
FIG. 2 is a side view of the invention partly in section and partly in elevation.

Referring now to the drawings and more specifically to FIGS. 1 to 5 it will be seen that one embodiment of my novel mixing apparatus designated generally by the reference numeral 10 is thereshown. This mobile mixing apparatus illustrated in FIGS. 1 to 5 is for use in preparing and mixing particulate material such as feed, grains, fodder, forage, cereals and the like and includes a mobile chassis or frame 11 including a pair of longitudinally extending frame members 12 which are rigidly interconnected at their respective front ends and are provided thereat with a hitch 13 in the form of a clevis as best seen in FIGS. 1 and 2. This mobile chassis is suitably mounted for fore and aft travel over the ground by ground engaging wheels 14. It is pointed out that this mobile mixing apparatus may be towed by any suitable prime mover such as a tractor or the like and will be connected to the tractor by the clevis 13 in a well known manner.

The forward portion of the mobile chassis or frame 11 is provided with a vertically adjustable front leg support 15 which, as best seen in FIG. 1, is disposed in an elevated inoperative position but which may be swung downwardly in a position to support the front end of the frame when the latter is detached from a prime mover. By novel mixing apparatus also includes a mixing hopper 16 which is formed of a suitable rigid metallic material and which includes upper peripheral wall portions 17 which are of substantially cylindrical configuration. The upper peripheral wall portions 17 of the hopper 16 converge downwardly to define downwardly converging intermediate portions 18, the latter terminating downwardly in a lower cylindrical portion 19. The hopper 16 is also provided with a top wall 20 and a bottom wall 21 so that the interior of the hopper is substantially closed from the exterior. The hopper 16 is also provided with a pair of inspection windows 22 as best seen in FIG. 1 to permit an operator to observe the interior of the hopper 16 during the mixing process.

A mixing auger assembly 23 is positioned within the mixing hopper 16 and includes a cylindrical auger housing or sleeve member 24 suspended from the top wall 20 of the hopper by suitable support braces 25 as best seen in FIG. 2. It will be noted that the mixing auger assembly 23 is vertically disposed and is centrally located with respect to the hopper and includes an elongate helical auger conveyor 26 extending through the housing 24 and projecting downwardly from the bottom thereof. The upper end portion of the shaft of the auger conveyor 26 is received within a suitable bearing 27 while the lower end thereof is also journaled for support in a suitable thrust bearing 28 carried by the bottom wall 21 of the hopper. It will be noted that the auger conveyor shaft projects beyond the auger housing 24 and has suitable paddle members or impeller blades 29 keyed thereto for rotation therewith. With this arrangement the particulate material, such as grain or the like, when conveyed upwardly through the auger housing 24 will be impelled outwardly by these paddles so that very effective mixing is accomplished.

It will also be noted that because of the particular configuration of the mixing hopper 16, the circulating particulate material will flow downwardly by action of gravity along the converging inclined intermediate wall portions 18 and into the cylindrical portion 19. It will be noted also that the diameter of the auger conveyor 26 is substantially less than the diameter of the cylindrical portion 21 and in order to achieve very effective mixing of the particulate material, the flights at the lower end of this auger conveyor 26 are enlarged as at 30. This enlarged portion 30 of the auger conveyor 26 is of a diameter only slightly smaller than the diameter of the lower cylindrical portion 19 of the mixing hopper 16 so that material within this cylindrical portion of the hopper will be engaged by the auger and moved upwardly thereby.

Means are also provided for feeding the material into the mixing hopper 16 and to this end a feed conveyor mechanism is provided and includes a rearwardly extending tubular auger housing 31 connected in communicating relation to the cylindrical portion 19 of the mixing hopper 16 as best seen in FIG. 2. A helical screw type auger conveyor 32 is revolvably supported within the tubular housing 32 to thereby convey material through the tubular housing 31 and into the lower end portion 19 of the mixing hopper 16. This arrangement permits the material being fed into the hopper to be elevated by the mixing auger conveyor immediately upon entry into the mixing hopper.

Quite often it is necessary to preliminarily treat the material to be mixed within a mixing hopper to thereby reduce the size of this material to a usable form for feed. Thus it is sometimes necessary to reduce the size of grain, fodder or the like to a suitable smaller particulate size and to this end a suitable hammer mill 33 is provided which serves to crush and grind the material into the size suitable for feed material. Referring again to FIG. 2 it will be noted that the feed auger 32 is connected in conveying relation with the hammer mill 33 so that the ground material produced by the hammer mill will be fed into the hopper 16 by this feed auger conveyor 32.

The hammer mill 33 is also provided with means for collecting the particles and dust and for return of the dust particles into the auger conveyor housing 31 so that this fine material may be used in the feed product. To this end, a conduit 34 has one end connected in communicating relation with the hammer mill 33 and has the other end connected to a suitable blower mechanism 35. The blower mechanism includes a bladed fan of conventional construction disposed in a suitable housing. A vertically disposed conduit 36 has its lower end connected in communicating relation with the blower mechanism 35 and has its upper end connected to the upper end portion of a cyclone type dust collector 37. This cyclone type dust collector 37 is provided with a suitable annular baffle 38 affixed to the upper wall thereof so that the fine particles and dust conveyed into the cyclone will descend in a cyclonic pattern to the lower end of the conically shaped collector. It will be noted as best seen in FIG. 3 that the lower end portion of the cyclone type dust collector 37 is connected in communicating relation to the feed auger conveyor housing 31 so that the dust collected during the crushing process will be conveyed into the mixing hopper 16 to thereby be used as a constituent of the final feed product. Referring now to FIG. 1 it will be seen that a suitable feed inlet 33a is provided and which may have a suitable conveyor means therein for facilitating feeding of the material into the hammer mill.

Means are provided for driving the hammer mill 33, the blower mechanism 35, the feed auger 32, the mixing auger 26 and other components of the mixing apparatus to be described hereinbelow. This drive means includes an elongate shaft 39 connectible to the power take-off of a prime mover such as a tractor or the like and also connectible by universal joint 40 to the main driven shaft 41. This main driven shaft 41 as best seen in FIG. 3 is disposed in substantially parallel relation with the hammer mill shaft 41a. The hammer mill shaft 41a is provided with a multi-groove pulley member 42 affixed in coaxial relation thereto for rotation therewith. The main driven shaft 41 is also provided with a multi-groove pulley member 44 which is substantially larger in diameter than the pulley member 42. A plurality of belt members 45 of conventional V-shaped cross-sectional configuration are trained over the pulleys 42 and 44 to thereby transmit the rotary drive from the main drive shaft 41 to the hammer mill shaft 41a.

Referring now to FIG. 2 it will be seen that another driven shaft 43 is supported centrally of the mobile chassis 11 and extends longitudinally thereof and this shaft is provided with a suitable sprocket 43a. The main driven shaft 41 also has a sprocket 41b affixed thereto for rotation therewith and an endless drive chain 41c is trained around the sprockets 41b and 43a to transmit rotary drive from the driven shaft 41 to the drive shaft 43.

It will also be noted that the driven shaft 43 also has a pulley 47 affixed thereto for rotation therewith at a point spaced rearwardly of the sprocket 43a. The auger conveyor 32 is provided with a suitable driven pulley 46 which is positioned above the pulley 47 and an endless V-type drive belt 48 is trained around the pulleys 46 and 47 whereby rotary motion from the driven shaft 43 is transmitted to the auger conveyor 32 so that the drive from the input shaft 39 will result in drive to the feed auger conveyor 32.

It is pointed out that the hammer mill 33 may be provided with suitable clutch means to permit disengagement of the hammer mill during the unloading operation. It is also pointed out that in as much as the hammer mill does not, per se, constitute the instant invention, this hammer mill will be provided with conventional sizing screens which are readily selectable to vary the size of the particles to be formed. Suitable valve means for the input gate may be provided to prevent clogging of feed flow into the mill and also prevent accumulation of debris and the like.

It will be seen that a gear housing 49 is secured to the lower wall 21 of the mixing hopper 16 and that the driven shaft 43 extends therethrough. A bevel gear 50 is keyed to the shaft 43 for rotation therewith and this bevel gear 50 is disposed in enmeshing relation with a bevel gear 51 affixed to the lower end of the mixing auger shaft. Thus the driven shaft 43 acting through bevel gears 50 and 51 serves to drive the mixing auger 26. A suitable seal bearing is provided for the gear housing 49 and is preferably of the type illustrated in my Patent 2,896,923.

From the foregoing it will be seen that my novel mixing apparatus is somewhat similar in construction and operation to that disclosed in my Patent No. 2,896,923. The material if it is to be preliminarily treated will be fed into the hammer mill where the large particles of material will be milled into relatively small particles for use in a feed product. In order to get the proper mixture, the material is then fed into the mixing hopper and the mixing auger assembly serves to constantly and continuously mix the various components therein to the desired degree. During this mixing operation, the material is elevated by the mixing auger 26 through the mixing auger housing 24 and is impelled outwardly by the paddles 29. The outwardly impelled particles slowly move downwardly by action of gravity and are ultimately received within the cylindrical portion 19 of the mixing hopper and are thereafter very effectively and quickly elevated again through the mixing auger housing.

It has been found that in many of the conventional mobile mixing devices, the unloading mechanism provided does not permit ready and easy unloading in places that are not readily accessible. Unloading augers are ordinarily provided in these conventional mixing devices but because of the limited amount of adjustment of these unloading augers in the conventional machines, the mixing device itself must be positioned in a predetermined relation to the unloading point in many instances. I have provided a novel unloading conveyor means which is not only of compact adjustable construction but permits unloading at points heretofore inaccessible to the conventional mixing apparatus. Referring again to the drawing, it will be seen that the mixing hopper 16 is provided with a rearwardly facing discharge feed outlet 52 in the converging portion 18 thereof. A suitable outlet closure member or gate 53 is provided for closing the feed outlet during the mixing operation and is mounted in vertical sliding relation with respect to the outlet 52 between outlet closing and open positions. A discharge chute 54 is connected in communicating relation with the feed outlet 52 and projects rearwardly therefrom. This discharge chute has a horizontally disposed discharge auger 55 revolvably supported therein for conveying the particulate feed product discharged into said chute rearwardly thereof.

This discharge chute is connected in communicating relation to a fixed auger section including a vertically disposed auger housing 56 which has its lower end mounted upon the rear portion of the mobile chassis 11. A screw type auger conveyor 57 is revolvably supported within the fixed auger housing 56 and when revolved receives the particulate material conveyed by the horizontal discharge auger 55 and conveys the material upwardly through the fixed auger housing 56. The upper end portion of the auger housing 56 terminates in an outturned annular flange 58 which is disposed in abutting relation with an outturned annular flange carried by the lower end portion of a first adjustable auger section 60. This first adjustable auger section 60 is of right angular construction and includes a housing comprised of a first leg portion 61 which is vertically disposed and a second leg portion 62 the latter being horizontally disposed. It will be noted that the auger conveyor 57 projects upwardly through the fixed auger housing 56 and into the leg portion 61 of the adjustable auger section 60. The adjustable auger section 60 is pivotally or revolvably connected to the fixed auger section by a clamping ring 73 which engages and retains the flanges 58 and 59 in abutting relation. Thus it will be seen that the adjustable auger section 60 is mounted for rotation about a substantially vertical axis through an arc of at least 180°. It is also pointed out that the axis of pivot of this adjustable auger section 60 is disposed in the longitudinally extending vertically center line plane of the mixing apparatus.

The upper end of the helical blade of auger 57 terminates in a substantially flat paddle or impeller blade 64 so that the particulate material will be readily impelled laterally into the leg portion 62 of the auger section 60. It will also be noted that the horizontally disposed screw type auger conveyor 65 is positioned within the leg portion 62 of the adjustable auger section 60 as best seen in FIG. 2. The upper end of the auger conveyor 57 is provided with a bevel gear 66 which meshes with the bevel gear 67 carried by the innermost end of the auger conveyor 65. Thus it will be seen that when the auger conveyor 57 is driven, this drive will also be imparted to the auger conveyor 65.

A second adjustable auger conveyor section 68 is provided and is of right angular construction including the leg portion 69 and a leg portion 70. The outermost end of the leg portion 62 is provided with an outturned flange 71 and the innermost end of the leg 69 is provided with an outturned flange 72. A suitable clamping means 73 embraces the flanges 71 and 72 to permit relative pivoting therebetween so that the adjustable auger section 68 may be revolved or pivoted relative to the adjustable auger section 60. Thus it will be seen that the adjustable auger section 68 is readily pivotable about a substantially horizontal axis relative to the adjustable section 60.

It will be noted that the auger conveyor 65 projects into the leg portion 69 of the adjustable auger section 68 and terminates at its outer end in a paddle or impelling blade 74. This permits impelling of the material from the leg portion 69 into the leg portion 70. The leg portion 70 has an elongate screw type auger conveyor 75 revolvably mounted therein for conveying the particulate material received from the auger conveyor 65 through the outer leg portion to be discharged through a discharge spout 76. The outermost end of the auger conveyor 65 has a bevel gear 77 affixed thereto which engages and meshes with the bevel gear 78 carried by the innermost end of the auger conveyor 75. Thus when the auger conveyor 65 is driven this rotary drive is also imparted to the auger conveyor 75. It is of interest to note that the enmeshing gears 66 and 67 are positioned within the sealed compartment formed by cooperating plates and that the interengaging bevel gears 77 and 78 are also disposed in the sealed compartment similarly formed by interengaging plates. Thus the particulate material conveyed by the auger conveyor 57 is impelled by the impelling portion or paddle 64 through an inclined angulated portion of the conveyor section 60 while the particulate material conveyed by the auger conveyor 65 will be impelled through the angulated portion of the conveyor section 68 by the paddle or impeller paddle 74.

Drive means are also provided for driving the entire discharge conveyor mechanism and to this end it will be seen that the driven shaft 43 is provided with a sprocket 79 intermediate its ends and revolvable therewith. The innermost end of the horizontal conveyor 55 is also provided with a sprocket 80 which is affixed thereto for rotation therewith. An endless drive chain 81 is trained around the sprockets 79 and 80 so that the annular movement of the driven shaft 43 is imparted to the sprocket chain drive to the horizontal discharge conveyor 55.

It will also be noted that the rear end portion of the driven shaft 43 terminates in close proximity to the lower end portion of the auger conveyor 57. This rear terminal portion of the driven shaft 43 has a bevel gear 82 affixed thereto for rotation therewith which is disposed in interengaging relation with the bevel gear 83 carried by the lower end of the auger conveyor 57. Thus the driven shaft acting through the bevel gear 82 drives the entire section of the discharge conveyor means. It is pointed out that although not shown in the drawing a suitable clutch means is provided whereby drive to the sectional discharge conveyor means may be rendered inoperative during the mixing operation.

Referring now to FIG. 3 it will be seen that the discharge conveyor means is illustrated diagrammatically in a plurality of adjusted positions by dotted line configuration. The leg portions 62 of the adjustable conveyor section 60 and the lower leg portion 69 of the adjustable conveyor section 68 have a combined length slightly greater than one half the width of the mixing hopper 16. With this arrangement it will be seen that the leg portion 70 of the conveyor section 68 may be positioned on either side and in close proximity to the mixing hopper. Furthermore since the pivotal axis of the outer or second adjustable auger section 68 is disposed substantially horizontally, this outer conveyor section may be pivoted through an arc exceeding 180° and approximately 270°. Thus it is possible to load into storage facilities below the surface of the ground or to elevated or remotely disposed bunks. Because of the almost universal adjustability of this discharge conveyor means, the unloading point may be located on either side of the mixing hopper and both forwardly and rearwardly of the hopper. Thus it will be seen that this universal adjustability of the discharge conveyor means does not necessitate a predetermined positioning of the mixing auger relative to the unloading point as is often the case with the conventional mixing devices.

Referring again to FIGS. 4 and 5 it will be seen that means are provided for readily pivoting or revolving the adjustable auger sections 68 relative to the adjustable auger section 60. To this end the leg portions 62 of the auger sections 60 are provided with a bracket 84 which projects beyond the outer terminal end of this leg portion 62. This bracket carries a sleeve type bearing 85 in which is revolvably supported a worm gear 86, the latter being provided with a suitable crank handle 87. A ring gear 88 is affixed to the leg portion 69 of the auger conveyor section 68 and this ring gear is disposed in interengaging relation with respect to the worm gear 86. Thus it will be seen that when the worm gear 86 is revolved by revolving the crank handle 87, this worm gear will drive the ring gear 88 to thereby revolve the outer auger section 68 about its horizontal axis. This permits an operator to very readily but easily adjust the second or outer conveyor section relative to the adjustable conveyor section 60 so that the feed product may be effectively and rapidly unloaded at any desirable unloading point. The inner auger conveyor section 60 may be readily revolved about its axis of pivot by manually swinging the two adjustable auger sections as a unit about the fixed auger section 56. Thus it will be seen because of the close combinative relation of the discharge conveyor means and the mixing hopper, the particulate feed product may not only be rapidly prepared but this product may be very easily and effectively unloaded to almost any desirable unloading point.

Referring now to FIGS. 6 and 7, it will be seen that a modified form of my mixing apparatus is there illustrated. This mixing apparatus illustrated in FIGS. 6 and 7 is designated generally by the reference numeral 10a and includes a mobile frame 11a which in this embodiment comprises a chassis of a truck T. The chassis is also comprised of suitable longitudinal frame members 12a in the manner of the embodiment of FIGS. 1 to 5. A mixing hopper 16a is also provided including an upper cylindrical portion 17a, a downwardly converging intermediate portion 18a and a lower cylindrical portion 19a. This mixing hopper 16a also has a top wall and a lower wall to substantially close the hopper from the exterior and the mixing auger assembly disposed therewithin is of substantially identical construction to the embodiment illustrated in FIGS. 1 to 5. Although not shown in the drawing, this embodiment also preferably has a hammer mill mechanism to permit the roughage to be reduced to a particulate size suitable for feed. The entire hammer mill assembly, the mixing auger assembly and the discharge conveyor means is suitably driven by the power take-off of the truck T. The specific details of this drive are thought to be unnecessary since the drive will be substantially identical to that of the embodiment illustrated in FIGS. 1 to 5.

The mixing hopper 16a is also provided with a rearwardly facing feed outlet and a rearwardly extending discharge chute 54a is connected in communicating relation thereto. This discharge chute is provided with a horizontal discharge auger for conveying the material into the fixed auger housing 56a, the latter being mounted in vertically extending relation on the rear end portion of the chassis 12a. This fixed auger housing 56a is provided with a vertically extending auger conveyor therewithin which conveys the material upwardly into an adjustable auger section 60a, the latter being of right angular construction in the manner of the adjustable auger of the embodiment illustrated in FIGS. 1 to 5. This adjustable auger section 60a includes a leg portion 61a which is arranged in substantially vertical extending relation and continuous with the fixed auger housing 56. The adjustable auger section 60a also includes a leg portion 62a which is horizontally disposed and which is connected in communicating relation with the leg portion 69a of the adjustable auger section 68a. This adjustable auger section 68a also includes a leg portion 70a which in turn is provided with a discharge spout 76a adjacent its outermost end. It is pointed out that this entire discharge conveying system is substantially identical to the discharge conveying means of the embodiment of FIGS. 1 and 5 and a detailed description thereof is felt unnecessary.

It is pointed out that an operator may control operation of the mixing apparatus 10a from the cab of the truck T and suitable control means will be provided therein. Power means are also provided for readily adjusting the adjustable auger section 60a relative to the fixed auger housing 56a and for also providing adjustment of the adjustable auger section 68a relative to the adjustable auger section 60a. This revolving means for adjusting the adjustable auger sections includes a pair of ring gears 87a one of which constitutes the revolving means between the adjustable outer auger section and the adjustable inner auger section and the other ring gear being associated with the revolving action between the fixed auger housing 56a and the auger section 60a. It will be noted that each of these ring gears 87a is affixed to one of a pair of slip joint members 87b. It is pointed out that one of these slip joint members 87b interconnects the upper end portion of the fixed auger housing 56a to the lower terminal end of the leg portion 61a of the adjust-able auger section 60a. The other of the slip joint members 87b is interposed between the outer terminal end of the leg portion 62a and the inner terminal end of the leg portion 69a of the auger conveyor section 68a. It is pointed out that each of these slip joint members 87b is of substantially cylindrical construction and is provided with outturned annular flanges. The opposite ends of the auger conveyor section 60a is also provided with annular flanges as is the upper terminal portion of the fixed auger housing 56a and the inner terminal portion of the conveyor section 68a. Suitable ring members interconnect the flanges of the slip joint member with the adjacent conveyor housing.

A pair of brackets 84a are provided and one of which is connected to the fixed auger housing 56a and the other of which is connected to the leg portion 62a of the adjustable auger conveyor section 60a. Each of these brackets 84a is provided with a sleeve type bearing 85a which revolvably supports a worm gear 86a which is disposed in interengaging relation with the associated ring gear 87a. Each of the worm gears has a sprocket 86b carried by one end thereof over which is trained an endless drive chain 86c. The endless drive chain 86c is trained around a suitable drive sprocket carried by hydraulic motor 86d. Thus when each of the hydraulic motors 86d is operated, the motors will cause revolving movement of the associated worm gear 86a which in turn revolves the associated ring gear 87a. Since each ring gear 87a is affixed to one of the slip joint members 87b, the slip joint member will also be caused to revolve. The interconnected flanged ends between the slip joint member 87b and the leg portion 61a of the adjustable auger section 60a is retained in sufficient frictional engagement so that normally when the slip joint member 87b is revolved the auger section 60a will also be revolved. However, in the event that the auger section 60a engages an object which prevents further movement, the flange joint connection between the slip joint member 87b and the leg 61a of the auger section 60a will slip relative to each other thereby preventing damage to the auger section 60a and the drive mechanism for revolving this auger section about its axis of pivot.

Similarly the flange joint connection between the slip joint 87b and the leg portion 69a of the auger section 68a is of sufficient tension to normally cause the outer auger section 68a to be revolved when the associated slip joint member 87b is revolved. This slip joint 87b will, however, revolve or slip relative to the adjustable auger section 68a in the event the latter engages or strikes an immovable object or obstruction.

The hydraulic motors 86d are connected by suitable conduits to a hydraulic pump mounted below the hood of trunk T and this pump is connected in fluid communicating relation with the reservoir 86f which contains a suitable supply of hydraulic fluid. These motors 86d may be individually and selectively operated by suitable control means located within the cab and it will be seen that the novel slip joint means is operable to prevent any damage to the discharge conveying system.

The mixing apparatus illustrated in the embodiment of FIGS. 6 and 7 is of identical compact construction as the embodiment illustrated in FIGS. 1 to 5. Thus it will be noted that the truck mounted mixing apparatus also permits unloading of the mixing hopper at almost any desirable unloading point without necessitating precise maneuvering of the truck relative to the unloading point. The discharge conveyor system may be rapidly adjusted to a position for unloading thereby permitting a great saving in time and labor.

From the foregoing it will be seen that I have provided a novel mobile mixing apparatus which not only permits effective mixing of particulate material such as grain, fodder and the like to produce a feed mix but also allows the prepared material to be very rapidly and effectively discharged therefrom to unloading points located at remote points above and below the surface of the ground.

It will be seen that I have not only provided a mixing apparatus, of inexpensive construction and operation, but one which functions in a more efficient manner than any heretofore known comparable device.

It will of course be understood that various changes may be made in the form, details, arrangement and proportions of the various parts without departing from the scope of my invention.

What is claimed is:

1. A portable feed mixing apparatus for use in mixing particulate material such as grain, fodder and the like, said apparatus including
    a mobile frame,
    a mixing hopper mounted in vertically extending relation on said frame and having an upstanding continuous closed peripheral wall including a downwardly converging portion,
    a vertically disposed mixing auger assembly centrally mounted within said mixing auger,
    drive means drivingly connected to said mixing auger assembly to drive the same and cause mixing of the particulate material within the hopper,
    a centrally located rearwardly opening feed outlet in the downwardly extending portion of the mixing hopper,
    adjustable discharge conveyor means including a discharge chute connected in communicating relation with said feed outlet and projecting rearwardly therefrom, conveyor means in said discharge chute for conveying material therethrough,
    a pair of right angular adjustable auger sections each being comprised of a pair of angularly connected leg portions, one of said auger sections having one leg portion thereof pivotally connected in communicating relation with said discharge chute for pivotal movement about a vertical axis lying within the longitudinally extending vertical center line plane of the hopper, said last mentioned adjustable auger section having its other leg pivotally connected to one leg portion of said other adjustable auger section to permit relative swinging movement of the latter about a substantially horizontally disposed axis,
    the adjacent leg portions of said adjustable auger sections being of a length to permit selective positioning of the outermost leg portion of said adjustable auger section on either side of and in close proximity to said hopper and substantially parallel to the longitudinal axis thereof.

2. A portable feed mixing apparatus for use in mixing particulate material such as grain, fodder and the like, said apparatus including
    a mobile frame,
    a mixing hopper mounted in vertically extending relation on said frame and having a continuous, closed peripheral wall including an intermediate portion converging downwardly, and terminating downwardly in a lower substantially cylindrical portion,
    a vertically disposed mixing auger assembly centrally mounted within said mixing hopper and having its lower end portion disposed within the cylindrical end portion of the hopper, said lower end portion of said mixing auger assembly having a cross sectional area substantially larger than the cross sectional area of the major portion of the mixing auger assembly so that the orbit of rotation of said enlarged lower end portion is disposed in close proximity and concentrically of the innermost surface of the lower cylindrical portion of the hopper,
    drive means drivingly connected to said mixing auger assembly to drive the same and to cause mixing of the particulate material within the hopper,
    a centrally located, rearwardly opening feed outlet in the intermediate portion of said mixing hopper,
    adjustable, sectional discharge conveyor mechanism including a discharge chute connected in communicating relation with said feed outlet and projecting rearwardly therefrom, conveyor means in said discharge chute for conveying material therethrough,
    a pair of right angular adjustable auger sections each being comprised of a pair of leg portions rigidly connected in angulated relation, one of said adjustable auger sections having one leg portion thereof pivotally connected in communicating relation with said discharge chute for pivotal movement about a vertical axis lying within the longitudinally extending vertical center line plane of the hopper, said last mentioned auger section having its other leg portion pivotally connected to one leg portion of said other adjustable auger section to permit relative swinging movement of the latter about a substantially horizontally disposed axis,
    the adjacent leg portions of said adjustable auger sections being of a length to permit selective positioning of the outermost leg portion of said other adjustable auger section on either side of and in close proximity to said hopper and substantially parallel to the longitudinal axis thereof,
    and an actuating mechanism on the adjacent leg portions of said adjustable auger sections for causing pivoting movement of the other auger section about its axis of pivot.

3. The structure as defined in claim 2 wherein said actuating mechanism comprises a worm gear carried by one of said auger sections and a ring gear carried by the other of said auger sections and engaging said worm gear,
    and an actuating crank connected to said worm gear for revolving the same.

4. The structure as defined in claim 2 wherein said actuating mechanism comprises a worm gear carried by said first mentioned adjustable auger section and a ring gear interconnected with the second mentioned adjustable auger section and engaging said worm gear,
    and hydraulic motor means mounted on said first mentioned adjustable auger section having drive connections with said worm gear for driving the same.

5. A portable feed mixing apparatus for use in mixing particulate material such as grain, fodder and the like, said apparatus including
    a mobile frame,
    a mixing hopper mounted in vertically extending relation on said frame and having an upstanding peripheral wall including an intermediate portion converging downwardly and terminating downwardly in a lower substantially cylindrical portion,
    a vertically disposed mixing auger assembly centrally mounted within said mixing hopper and having a lower end portion disposed within a cylindrical end portion of the hopper, said lower end portion of said mixing auger assembly having a cross sectional area substantially larger than the cross sectional area of the major portion of the mixing auger assembly, so that the orbit of rotation of said enlarged lower end portion is disposed in close proximity and concentrically of the inner wall surface of the lower cylindrical portion of the hopper,
    drive means drivingly connected to said mixing auger assembly to drive the same and cause mixing of the particulate material within the hopper,
    a centrally located, rearwardly opening feed outlet in the intermediate portion of said mixing hopper,
    adjustable, sectional discharge auger conveyor mechanism including a substantially horizontally disposed discharge chute connected in communicating relation with said feed outlet and projecting rearwardly therefrom, conveyor means in said discharge chute for conveying material therethrough,
    a vertically disposed fixed auger section having its lower end portion connected in communicating relation with said discharge chute and projecting upwardly therefrom, a pair of right angular adjustable auger sections each being comprised of a pair of angularly connected leg portions, one of said adjustable auger sections having one leg portion thereof pivotally connected in communicating relation with said fixed auger section for pivotal movement about a vertical axis lying within the longitudinally extending vertical center line plane of the hopper, said one adjustable auger section having its other leg pivotally connected to one leg portion of said other adjustable auger section to permit relative swinging movement of the latter about a substantially horizontally disposed axis, the adjacent leg portion of said adjustable auger sections being of a length to permit selective positioning of the outermost leg portion of said other adjustable auger section on either side of and in close proximity to said hopper and in substantially parallel relation to the longitudinal axis thereof, and an actuating mechanism on the adjacent leg portions of said adjustable auger sections and being operable to cause shifting movement of said other auger section about its horizontal axis of pivot.

6. A portable feed mixing apparatus for use in mixing particulate material and the like, said apparatus including a mobile frame, a mixing hopper mounted in vertically extending relation on said frame and having an upstanding continuous peripheral wall including a downwardly converging portion, a vertically disposed mixing auger assembly centrally mounted within said mixing hopper, drive means drivingly connected to said mixing auger assembly to drive the same to cause mixing of the particulate material within the hopper, a centrally located rearwardly opening feed outlet in the downwardly extending portion of the mixing hopper, adjustable discharge conveyor means including a substantially horizontally disposed discharge chute connected in communicating relation with said feed outlet and projecting rearwardly therefrom, conveyor means in said discharge chute for conveying material therethrough, a vertically disposed fixed auger section having its lower end portion connected in communicating relation with said discharge chute and projecting upwardly therefrom, a pair of right angular adjustable auger sections each being comprised of a pair of angularly connected leg portions, one of said adjustable auger sections having one leg portion thereof pivotally connected in communicating relation with said fixed auger section for pivotal movement about a vertical axis lying within the longitudinally extending vertical center line plane of the hopper, a slip joint auger section interconnecting one leg portion of said one adjustable auger section with one leg portion of the other of said adjustable auger sections to permit relative swinging movement of the latter about a substantially horizontally disposed axis, the adjacent leg portions of said adjustable auger sections being of a length to permit selective positioning of the outermost leg portion of said other adjustable auger section on either side of and in close proximity to said hopper and substantially parallel to the longitudinal axis thereof, actuating mechanism for causing pivoting movement of said other auger section about its axis of pivot and comprising a worm gear carried by said one adjustable auger section and a ring gear carried by said slip joint section and engaging said worm gear, and hydraulic motor means having driving connections with said worm gear to revolve the same whereby said slip joint auger section and said other adjustable auger section will normally revolve as a unit about their axis of pivot of the latter, but permitting relative pivoting movement between said other adjustable auger section and said slip joint section when said other auger section engages an immovable object.

7. A portable feed mixing apparatus for use in mixing particulate material such as grain, fodder and the like, said apparatus including a mobile frame, mixing hopper mounted in vertically extending relation on said frame and having an upstanding continuous closed peripheral wall including a downwardly converging portion, a vertically disposed mixing auger assembly centrally mounted within said mixing hopper, means for driving said mixing auger assembly to cause mixing of the particulate material within the hopper, a centrally located rearwardly opening feed outlet in the downward extending portion of the mixing hopper, adjustable discharge conveyor means including a discharge conveyor mechanism connected in communicating relation with said feed outlet and projecting rearwardly therefrom, a pair of angularly adjustable auger sections each being comprised of a pair of angularly connected leg portions, one of said auger sections having a leg portion thereof pivotally connected in communicating relation with said discharge conveyor mechanism for pivotal movement about a vertical axis lying substantially within the longitudinally extending vertical center line plane of the hopper, said last mentioned adjustable auger section having its other leg pivotally connected to one leg portion of said other adjustable auger section to permit relative swinging movement of the latter about a substantially horizontally disposed axis.

the adjacent leg portion of said adjustable auger section being of a length to permit selective positioning of the outermost leg portion of said adjustable auger section on either side of and in close proximity to said hopper and substantially parallel to the longitudinal axis thereof.

References Cited in the file of this patent

UNITED STATES PATENTS

| | | |
|---|---|---|
| 2,815,941 | Schmale | Dec. 10, 1957 |
| 2,896,923 | Luscombe | July 28, 1959 |